United States Patent
Allidieres et al.

(10) Patent No.: US 8,360,112 B2
(45) Date of Patent: Jan. 29, 2013

(54) METHOD AND DEVICE FOR FILLING PRESSURE GAS CONTAINERS

(75) Inventors: Laurent Allidieres, Saint Martin D'Uriage (FR); Jaya-Sitra Pregassame, Paris (FR); Thomas Charbonneau, Westmount (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 842 days.

(21) Appl. No.: 12/160,062

(22) PCT Filed: Dec. 13, 2006

(86) PCT No.: PCT/FR2006/051338
§ 371 (c)(1),
(2), (4) Date: Dec. 3, 2008

(87) PCT Pub. No.: WO2007/077376
PCT Pub. Date: Jul. 12, 2007

(65) Prior Publication Data
US 2009/0107577 A1  Apr. 30, 2009

(30) Foreign Application Priority Data
Jan. 6, 2006 (FR) ..................... 06 50053

(51) Int. Cl.
*B65B 31/00* (2006.01)
(52) U.S. Cl. ............... 141/4; 141/39; 141/47; 141/102; 141/197
(58) Field of Classification Search ........ 141/1, 4, 141/39, 40, 47, 102, 192, 197
See application file for complete search history.

(56) References Cited

U.S. PATENT DOCUMENTS

| 4,174,463 A * | 11/1979 | Albert, Jr. ............... 174/79 |
| 4,646,940 A | 3/1987 | Kramer et al. |
| 5,431,203 A | 7/1995 | Schultz et al. |
| 5,479,966 A | 1/1996 | Tison et al. |

(Continued)

FOREIGN PATENT DOCUMENTS
EP  0 653 585  5/1995
FR  2 879 719  6/2006

(Continued)

OTHER PUBLICATIONS

International Search Report for PCT/FR2006/051338, Aug. 29, 2007.

*Primary Examiner* — Gregory Huson
*Assistant Examiner* — Jason Niesz
(74) *Attorney, Agent, or Firm* — Christopher J. Cronin

(57) ABSTRACT

The inventive method for filling a pressure gas container from a gas source pressure with a high pressure for a predetermined filling time selected or calculated prior to filling and at a determined temperature consists in forming a connection in the form of a fluid passage between the source and container, in carrying out a plurality of the passage opening-closing sequences during predetermined sub-intervals of the predetermined filling time, wherein the curve of a current pressure in the container follows, according to a time, a theoretical straight line linking the pressure measured prior to filling and after thereof during the filling time, the predetermined filling time is subdivided into a number of the time sub-intervals ranging from two to several hundreds and having respective determined duration, preferably ranging from 5 and 20 seconds.

13 Claims, 1 Drawing Sheet

U.S. PATENT DOCUMENTS

| | | | |
|---|---|---|---|
| 5,488,978 A * | 2/1996 | Kountz et al. | 141/4 |
| 5,513,678 A * | 5/1996 | Schultz et al. | 141/4 |
| 5,570,729 A | 11/1996 | Mutter | |
| 5,752,552 A | 5/1998 | Kountz et al. | |
| 5,771,947 A | 6/1998 | Kountz et al. | |
| 5,771,948 A | 6/1998 | Kountz et al. | |
| 5,868,176 A | 2/1999 | Barajas et al. | |
| 5,881,779 A | 3/1999 | Kountz et al. | |
| 5,901,758 A | 5/1999 | Hwang et al. | |
| 6,655,422 B2 | 12/2003 | Shock | |
| 6,708,573 B1 | 3/2004 | Cohen et al. | |
| 6,907,740 B2 * | 6/2005 | Tom | 62/55.5 |
| 7,568,507 B2 * | 8/2009 | Farese et al. | 141/95 |
| 2003/0070724 A1 | 4/2003 | Shock | |
| 2003/0150510 A1 * | 8/2003 | Cohen et al. | 141/83 |
| 2004/0163731 A1 | 8/2004 | Eichelberger et al. | |
| 2005/0178463 A1 | 8/2005 | Kountz et al. | |
| 2006/0180236 A1 | 8/2006 | Hoke, Jr. | |
| 2006/0180237 A1 | 8/2006 | Hoke, Jr. et al. | |
| 2007/0186982 A1 | 8/2007 | Cohen et al. | |
| 2008/0000542 A1 | 1/2008 | Cohen et al. | |

FOREIGN PATENT DOCUMENTS

| | | |
|---|---|---|
| JP | 42 24399 | 8/1992 |
| JP | 81 00892 | 4/1996 |
| JP | 82 91898 | 11/1996 |
| JP | 90 79495 | 3/1997 |
| JP | 90 79496 | 3/1997 |
| JP | 2002 115 796 | 4/2002 |

* cited by examiner

METHOD AND DEVICE FOR FILLING PRESSURE GAS CONTAINERS

CROSS-REFERENCE TO RELATED APPLICATIONS

This application is a §371 of International PCT Application PCT/FR2006/051338, filed Dec. 13, 2006.

BACKGROUND

The present invention relates to a method and a device for filling pressure gas containers.

The invention relates in particular to a method and a device for filling containers such as pressurized gas cylinders or tanks.

The filling of high pressure vessels, for example on board vehicles running on hydrogen gas, must be carried out as quickly as possible to decrease the vehicle immobilization time.

The final service pressures of these vessels or tanks are generally between 350 and about 700 bar.

Due to the virtually adiabatic nature of the compression of the gas in the tanks and the high final pressures, the gas temperature in the tanks rises rapidly and is liable to damage the composite structure of the tanks.

It is therefore important to limit this temperature rise to the design temperature of the tank, that is a maximum allowable temperature (generally about 85° C.).

One known solution for controlling this filling temperature consists in interrupting the filling in case of overheating.

Another solution consists in controlling the filling rate so that it remains lower than a flow rate that could cause excessive temperature rise.

These two known methods require control of the flow rate of gas fed to the tank and therefore the use of a high pressure control valve, which is very expensive.

In these known solutions, a first embodiment consists in controlling the gas flow rate directly upstream or downstream of the control valve.

A second embodiment not using a flowmeter consists in controlling the pressure rise rate downstream of the control valve (the pressure rise rate being the derivative of the pressure downstream of the valve with respect to time).

The filling is generally carried out from a pressure gas reserve. Thus, in these prior art solutions, as the pressure increases in the tank to be filled (downstream of the valve), the pressure in the source decreases. The dynamic control range of the valve is therefore very important because it must control a flow rate or a constant temperature rise, whereas neither the pressure upstream of the valve nor the pressure downstream of the valve is constant. The valve control loops therefore require a relatively long adjustment time and a control valve having a broad opening/closing dynamic range. A poor adjustment of the valve control loop either prevents reaching the target pressure at the end of filling or causes overheating of the tank if the target pressure is reached before the planned filling time.

It is an object of the invention to propose a method for filling a pressure gas container that overcomes all or part of the drawbacks of the prior art.

SUMMARY OF THE INVENTION

This aim is achieved by the fact that in the method for filling a pressure gas container, in particular from a gas source at a pressure known as a high pressure, for a predefined filling time selected or calculated prior to filling and at a predefined temperature, the container having a predefined initial internal pressure before filling and a predefined final pressure after filling, in which a connection is produced in the form of a fluid passage between the source and the container, and in which a plurality of the passage opening and closing sequences are carried out during predefined time sub-intervals of the predefined filling time, said time sub-intervals and the corresponding opening and closing sequences being dimensioned so that, during the predefined filling time, the curve of a current pressure in the container follows, as a function of time, a theoretical line linking the pressure measured before and after the filling during the filling time, the predefined filling time is subdivided into a number of time sub-intervals ranging from two to several hundred seconds having predefined durations, preferably ranging from 5 to 20 seconds.

Moreover, the invention may comprise one or more of the following features:

- the ends of the curve of the current pressure in the container as a function of time are substantially merged respectively with the ends of the theoretical line linking the pressures before and after the filling,
- the method comprises, during each time sub-interval, a first step of opening of the passage from the start of the time sub-intervals, followed by a second step of closing of the passage from the time when the current pressure in the container reaches a predefined value at least close to and preferably equal to the pressure value given by the theoretical line at this time of filling, and in that the passage is kept closed until the end of the time sub-interval,
- the time sub-intervals and the corresponding opening and closing sequences are dimensioned so that, substantially at any given time of filling during the predefined filling time, the curve of the current pressure in the container as a function of time deviates from the theoretical line by a pressure value lower than 30 bar and preferably lower than 10 bar or lower than 20% and preferably lower than 5% of the pressure value given by the line at this time of filling,
- the filling time is subdivided into a number of time sub-intervals ranging from two to several hundred seconds having predefined durations, preferably ranging from 5 to 20 seconds,
- the filling is exclusively controlled using the current pressure in the container,
- the ambient temperature and the initial pressure in the container are measured before filling,
- the final filling pressure is calculated as a function of a desired filling time,
- the container is filled at a temperature calculated as a function of the initial internal pressure, the ambient temperature and the final pressure after filling, the calculated filling temperature possibly being lower than the ambient temperature.

According to another feature, the method comprises:
- a step of determining the ambient filling temperature,
- a step of determining the initial internal pressure of the container before filling,
- a step of selecting a quantity of gas to be introduced into the container during the filling and/or a step of selecting a maximum allowable filling time,
- a step of calculating the final pressure after filling in the container as a function of the ambient filling temperature, the initial internal pressure in the container and the quantity of gas to be introduced and/or the maximum allowable time, a step of determining the filling time before filling, as a function of the ambient filling temperature, the initial internal pressure in the container and the quantity of gas to be introduced and/or the maximum allowable time, the final pressure after filling in the container is calculated to correspond to the more severe of the following two conditions: nominal filling capacity of the container or the design temperature of the container, the opening and closing sequences are carried out by a member of the "on-off" valve type, without flow rate or temperature control, the opening and closing sequences are triggered exclusively as a function of the pressure measurement in a filling line connecting the source to the container.

It is a further object of the invention to propose a device for filling a pressure gas container and for implementing the method.

The device for filling pressure gas containers and implementing the method according to any one of the preceding features, comprises a gas source at a pressure known as a high pressure, means for measuring the ambient filling temperature, means suitable for being connected to a container to form a fluid passage between the source and the container, valve forming means on the passage, means for determining the current pressure in the container, data processing and control means connected: to the valve forming means, to the means for determining the current pressure, and to the means for measuring the ambient temperature; the data processing and control means calculating or receiving setpoints relative to a predefined filling time and a final pressure of the container after filling, in order to control the opening and closing of the valve forming means, in which, for a container to be filled, the valve forming means being controlled in order to carry out a plurality of sequences of opening and closing the passage during predefined time sub-intervals of the filling time, said time sub-intervals and the corresponding opening and closing sequences being dimensioned so that, during the predefined filling time, the curve of a current pressure in the container follows, as a function of time, roughly matches the theoretical line linking the pressure measured before and after the filling during the filling time, the valve forming means comprise a first on-off type valve, for example having automatic control.

According to other possible features:

the means for determining the current pressure in the container comprise a pressure sensor measuring the pressure downstream of the valve forming means, the valve forming means comprise a second valve positioned downstream of the first valve, such as a micrometric flow metering valve, the device comprises, on the passage, at least one of the following means: a safety valve system, a decompression system, the passage comprises a line for connection to an orifice of a container and provided with pulloff prevention means and coupling means suitable for being connected to conjugated coupling means of a container.

BRIEF DESCRIPTION OF THE FIGURES

Other features and advantages of the invention will appear better from a reading of the description below, with reference to the figures, in which.

DETAILED DESCRIPTION OF THE INVENTION

Figure 1:
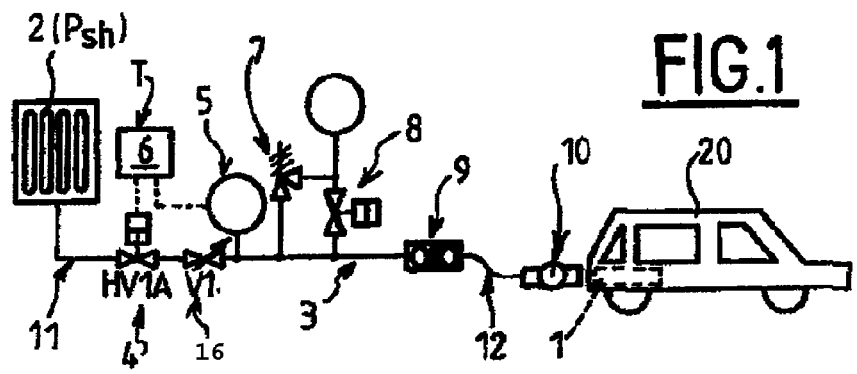
FIG. 1 shows a schematic view illustrating the structure and functioning of a filling system according to an exemplary embodiment of the invention, FIG. 2 schematically shows several examples of curves of the variation in the pressure of a container as a function of time during various fillings.

The device or station for filling pressure gas containers shown in FIG. 1 comprises a source 2 of pressurized gas comprising, for example, one or more vessels or cylinders storing the gas at a pressure of about 700 bar for example. The source contains for example hydrogen gas intended to fill tanks 1 of vehicles 20. An outlet of the gas source 2 is connected to a filling line 11 comprising a first flow control valve 4 having a relatively wide passage (having a flow diameter of about 5 to 10 mm for example). Downstream of the first valve 4, the filling line 11 comprises in series a second flow control valve 16 to generate a predefined pressure drop downstream of the first valve 4. Obviously, the two valves 4 and 16 in series could be replaced by a single valve, for example pneumatic, having an appropriate passage (flow rate) and opening/closing system.

Downstream of the second valve 16, the filling station comprises a pressure sensor 5 or transmitter connected to control means 6 of the first valve 4. The control means 6 of the valve 4 may also receive other data, such as the ambient temperature T at which the filling is carried out. The filling line 11 then comprises a safety valve 7 in case of overpressure in the line and a valve 8 for decompressing the line 11. Downstream, the line 11 preferably comprises a pulloff prevention system 9 connected to a hose 12 whereof the end comprises a connector 1 intended to cooperate directly with a tank 1 to be filled or with a circuit of a tank 1 to be filled such as that of a vehicle 20.

Downstream of the second valve 6, the filling station comprises a pressure sensor 5 or transmitter connected to control means 13 of the first valve 4. The control means 13 of the valve 4 may also receive other data, such as the ambient temperature T at which the filling is carried out. The filling line 11 then comprises a safety valve 7 in case of overpressure in the line and a valve 8 for decompressing the line 11. Downstream, the line 11 preferably comprises a pulloff prevention system 9 connected to a hose 12 whereof the end comprises a connector 10 intended to cooperate directly with a tank 1 to be filled or with a circuit of a tank 1 to be filled such as that of a vehicle 20.

An exemplary filling can take place as follows. Before performing the filling, the filling station may automatically determine the initial pressure Pci in the tank 1 of the vehicle 20, using the pressure measurement taken by the pressure sensor 5 and the ambient filling temperature measurement T. Depending on these parameters and optionally other filling parameters, such as desired filling time and/or a desired quantity of gas, the station can automatically calculate (data processing means for example) a final pressure Pcf to be reached in the tank 1 and the corresponding filling time Dab.

Figure 2:
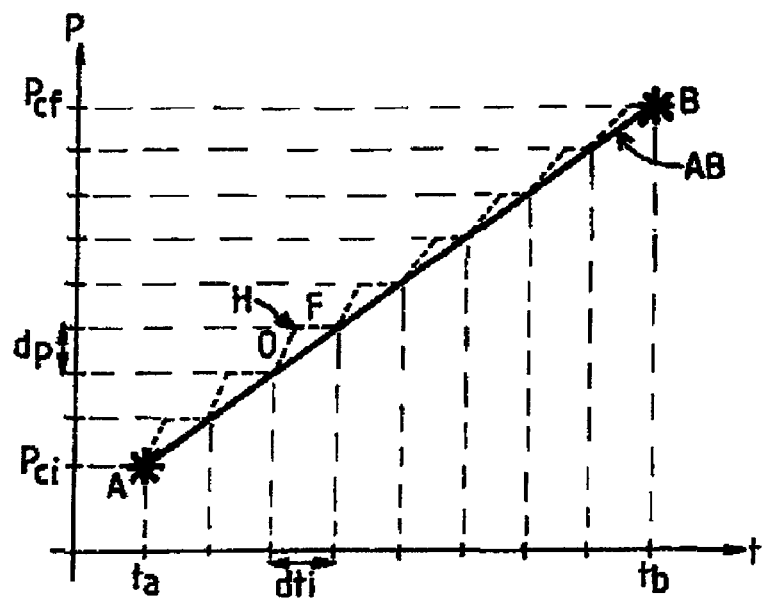
Figure 3:
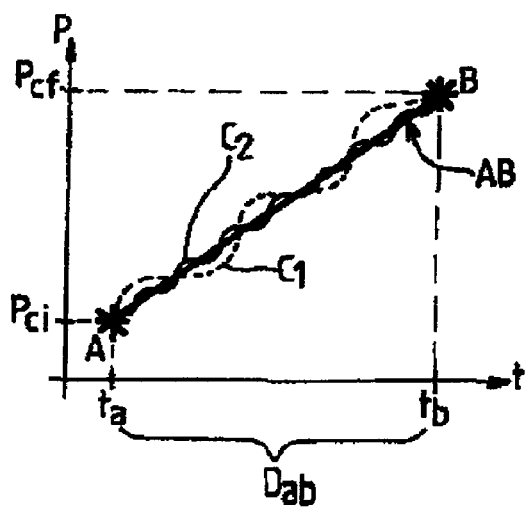
FIG. 3 schematically shows several examples of curves of the variation in the pressure of a container as a function of time during various fillings.

Thus, and as shown in FIGS. 2 and 3, the system can define, for the tank 1, a starting point A with an initial pressure Pci at a starting time ta and an end point B with a final pressure Pcf at a later time tb (filling time Dab=tb−ta). Ideally, the filling can follow the theoretical line AB linking the two starting A and end B points.

According to a particularly advantageous feature, the first valve 4 is controlled by performing a succession of openings O and closings F, the second valve 6 remaining open.

The first valve 4 is controlled preferably by discretizing the planned filling time Dab into several sub-intervals each having a shorter duration, of about 5 to 20 seconds for example (cf. FIG. 2). The time sub-intervals dti may have equal or different durations.

For each time sub-interval dti, the control means 13 calculate a pressure difference dp (cf. FIG. 2) corresponding to the pressure increase that would be obtained by the theoretical line AB. The first control valve 4 is opened O at the start of each time sub-interval dti and remains open until this pressure differential (increase dp) is reached (cf. FIG. 2). The first valve 4 is closed F when this pressure differential dp is reached (point H, cf. FIG. 2), or at least when a value close to said pressure differential dp is reached (higher or lower).

The second valve 6 is preferably a micrometric metering valve and its flow rate is adjusted to permit the closure of the first valve 4 at the end of each time sub-interval dti. This adjustment is made during the implementation of the station by performing a complete filling of an empty tank so that the valve closes during all the intervals dti, in particular at the end of filling. In the nonlimiting example in FIG. 2, the pressure differential (Pcf−Pci) between the starting point A (ta) and end point B (tb) is discretized into eight equal time sub-intervals dti each having a duration of Dab=(tb−ta)/8 and a pressure differential DP=(Pcf−Pci)/8.

Thus, at the start of each time sub-interval dti, the first valve 4 is opened (step O) and then closed as soon as the "target pressure" dpi is reached (point H). The valve 4 then remains closed until the end of the time sub-interval.

In this way, the valve 4, which serves to control the filling of the tank 1, may be an automatic valve of the on-off type, thereby eliminating the need for a costly high pressure flow control valve, which is delicate and unreliable. The applicant has found that the result of such a filling is identical to that obtained via control by a control valve.

In fact, the applicant has found that, to join the final filling point B from the starting point A, regardless of the "path" taken by the curve of pressure P as a function of time t, the final temperature in the tank is substantially the same and therefore the quantity of gas transferred will be substantially the same. Thus, as shown in FIG. 3, for the same filling time Dab, for the two curves C1 and C2 which are substantially close to the theoretical line AB, the filling result will be substantially identical in terms of the final temperature in the tank and the quantity of gas transferred.

According to the invention, it is therefore unnecessary to provide for a transfer or communication of data (pressure or temperature) with the vehicle. In fact, the pressure measurement on the filling line 11 of the station suffices.

This pulsed filling mode also serves to make the temperature uniform inside the filled tank and avoids local overheating and other temperature stratification. In the case in which the filling gas is a mixture, the invention permits better homogenization of the mixture.

Preferably, the tank filling requirements are satisfied by calculating a final pressure Pcf corresponding to the more severe of the two following conditions: "nominal filling capacity" or "tank design temperature". If the final filling pressure is lower than or equal to this maximum filling pressure, the operation remains within the operating limits of the cylinder.

The "tank design temperature" is the maximum temperature that can be reached in a tank in service, and this value is given by the manufacturer.

The "nominal filling capacity" is the mass of gas that can be stored in a given tank. This value is also specified by the manufacturer and is generally given in the form of a nominal pressure at a nominal temperature.

The filling is interrupted when the inlet pressure reaches this maximum filling pressure Pcf.

This method serves to satisfy the two safety limit values, that is the nominal capacity and the maximum allowable temperature for the tank.

In practical terms, the initial pressure of the tank Pci can be measured by balancing the connector and the filling line with the tank by injecting a small quantity of gas. The ambient temperature T is also measured at the filling station. The ambient temperature T measured at the station must be representative of the surroundings of the tank. In general, the temperature measured at the filling terminal is fairly representative of the temperature at the tank, but it may be useful to confirm this and optionally make a correction.

The device then calculates the maximum pressure corresponding to the nominal mass or the design temperature, using measured parameters which are the ambient temperature T and the initial pressure Pci in the tank, and using the value of the desired filling time Dab and/or the desired quantity of gas.

During the filling, the gas pressure P can be measured at the connector or the filling line, downstream of the valve 4. The pressure P measured at this level is equal to the pressure in the tank 1 during the filling.

The filling can therefore be controlled exclusively using the measured inlet pressure P. It is therefore unnecessary to measure the tank temperature in real time.

According to an advantageous alternative, the filling can be carried out "cold" that is, the filling is carried out with gas cooled to a given temperature. According to this particular embodiment, the temperature of the gas entering the tank is calculated according to the following parameters: the initial pressure Pci, the ambient temperature T, the final filling pressure Pcf and the filling times and/or the quantity of gas to be transferred, while complying with the operating limits of the cylinder.

The final pressure Pcf can be set arbitrarily or according to the process conditions for example. However, it must definitely be lower than the maximum allowable pressure for the tank. For example, in the case in which the tank is filled by balancing pressure storage vessels, the final pressure is limited by the storage pressure of the vessels, or even to a lower value due to the pressure balancing.

The inventive method is particularly useful for rapid fillings, in particular rapid fillings of motor vehicles. A rapid filling is a filling which must be carried out for example within a period ranging from less than 1 minute to 10 minutes. This duration depends on the cylinders to be filled and/or the type of vehicle (scooter, car or bus for example).

The present invention is usable regardless of the type of gas. It may be used for example with methane, hydrogen, oxygen, nitrogen, helium, etc. The vehicle application particularly concerns natural gas, hydrogen or any mixture of natural gas and hydrogen.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for filling a pressure gas container from a gas source at high pressure, comprising the steps of:

selecting or calculating a predetermined filling time for the container at a predetermined temperature prior to filling, the container having a predefined initial internal pressure before filling and a predefined final pressure after filling, the predetermined filling time subdivided into a number of time sub-intervals;

performing a plurality of openings and closings of a fluid passage between the source and the container during the predefined time sub-intervals, said time sub-intervals and the corresponding openings and closing being selected so that, during the predefined filling time, a curve of a current pressure in the container approximates during the filling time, as a function of time, a theoretical line linking a pressure measured before and after the filling.

2. The method of claim 1, wherein ends of the curve of the current pressure in the container as a function of time are substantially merged respectively with the ends of the theoretical line linking the pressures before and after the filling.

3. The method of claim 1, wherein each time sub-interval comprises a first step of opening of the passage from the start of the time sub-intervals followed by a second step of closing of the passage from the time when the current pressure in the container reaches a predefined value at least close to the pressure value given by the theoretical line at this time of filling, wherein the passage is kept closed until the end of the time sub-interval.

4. The method of claim 1, wherein time sub-intervals and the corresponding opening and closing sequences are selected so that, substantially at any given time of filling during the predefined filling time, the curve of the current pressure in the container as a function of time deviates from the theoretical line by a pressure value less than 30 bar.

5. The method of claim 1, wherein the filling is exclusively controlled using the current pressure in the container.

6. The method of claim 1, further comprising the steps of:
determining an ambient filling temperature;
determining an initial internal pressure of the container before filling;
selecting a quantity of gas to be introduced into the container during the filling and/or selecting a maximum allowable filling time;
calculating a final pressure achievable upon filling the container as a function of the ambient filling temperature, the initial internal pressure in the container and the quantity of gas to be introduced and/or the maximum allowable time; and
determining the filling time before filling, as a function of the ambient filling temperature, the initial internal pressure in the container and the quantity of gas to be introduced and/or the maximum allowable time.

7. The method of claim 6, wherein the final pressure after filling in the container is calculated to correspond to a more severe of two conditions: a nominal filling capacity of the container or a design temperature of the container.

8. The method of claim 1, wherein the openings and closings are carried out by an "on-off"-type valve without flow rate or temperature control.

9. The method of claim 1, wherein the openings and closings are triggered exclusively as a function of the pressure measurement in a filling line connecting the source to the container.

10. The method of claim 1, wherein each time sub-interval comprises a first step of opening of the passage from the start of the time sub-intervals followed by a second step of closing of the passage from the time when the current pressure in the container reaches a predefined value equal to the pressure value given by the theoretical line at this time of filling, wherein the passage is kept closed until the end of the time sub-interval.

11. The method of claim 1, wherein time sub-intervals and the corresponding opening and closing sequences are selected so that, substantially at any given time of filling during the predefined filling time, the curve of the current pressure in the container as a function of time deviates from the theoretical line by a pressure value less than 10 bar.

12. The method of claim 1, wherein time sub-intervals and the corresponding opening and closing sequences are selected so that, substantially at any given time of filling during the predefined filling time, the curve of the current pressure in the container as a function of time deviates from the theoretical line by a pressure value lower than 20% of the pressure value given by the line at this time of filling.

13. The method of claim 1, wherein time sub-intervals and the corresponding opening and closing sequences are selected so that, substantially at any given time of filling during the predefined filling time, the curve of the current pressure in the container as a function of time deviates from the theoretical line by a pressure value lower than 5% of the pressure value given by the line at this time of filling.

* * * * *